United States Patent
Feng et al.

(10) Patent No.: US 11,149,857 B2
(45) Date of Patent: Oct. 19, 2021

(54) APPLIANCE FOR MAKING ISOTROPICALLY FINISHED SEAL RING OF SEAL ASSEMBLY FOR MACHINE

(71) Applicant: Caterpillar Inc., Deerfield, IL (US)

(72) Inventors: Bao Feng, Peoria, IL (US); Connor J. Haas, New Braunfels, TX (US); Joseph J. Every, Peoria, IL (US); Daniel P. Vertenten, Aurora, IL (US); John M. Spangler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/120,383

(22) Filed: Dec. 14, 2020

(65) Prior Publication Data
US 2021/0095767 A1    Apr. 1, 2021

Related U.S. Application Data

(62) Division of application No. 16/287,708, filed on Feb. 27, 2019, now Pat. No. 10,927,959.

(51) Int. Cl.
*F16J 15/34* (2006.01)
*B21K 1/20* (2006.01)

(52) U.S. Cl.
CPC ............. *F16J 15/3404* (2013.01); *B21K 1/20* (2013.01); *F16J 15/344* (2013.01); *F16J 15/3496* (2013.01); *Y10T 29/49297* (2015.01)

(58) Field of Classification Search
CPC .... F16J 15/3404; F16J 15/344; F16J 15/3496; Y10T 29/49297
See application file for complete search history.

(56) References Cited

U.S. PATENT DOCUMENTS

| | | |
|---|---|---|
| 4,491,500 A | 1/1985 | Michaud et al. |
| 4,705,594 A | 11/1987 | Zobbi et al. |
| 4,818,333 A | 4/1989 | Michaud |
| RE34,272 E | 6/1993 | Michaud et al. |
| 6,387,080 B1 | 5/2002 | Rødsten |
| 6,656,293 B2 | 12/2003 | Black et al. |
| 7,641,744 B2 | 1/2010 | Winkelmann |
| 8,171,637 B2 | 5/2012 | Michaud et al. |
| 8,313,823 B2 | 11/2012 | Spangler et al. |
| 8,747,945 B2 | 6/2014 | Spangler et al. |
| 8,858,734 B2 | 10/2014 | Michaud et al. |

(Continued)

*Primary Examiner* — Jason L Vaughan
*Assistant Examiner* — Amanda Kreiling
(74) *Attorney, Agent, or Firm* — Leydig, Voit & Mayer, Ltd.

(57) ABSTRACT

A seal ring for a seal assembly includes a body and a seal flange. The body is generally cylindrical, extending along a longitudinal axis between a load end and a seal end. The seal flange is disposed adjacent the seal end of the body, projecting radially in a circumscribing manner from the body. The seal flange includes a sealing face having a sealing band for sealing contact with a mating seal ring. A layer of coating composition formulated to help increase the corrosion resistance of the seal ring is applied to at least the body. A mask is applied to the seal ring to cover at least a portion of the seal ring having the layer of coating composition applied thereto such that the sealing band remains exposed. The sealing band is polished by an isotropic finishing process. The mask is removed after the sealing band is isotropically polished.

6 Claims, 10 Drawing Sheets

(56) References Cited

U.S. PATENT DOCUMENTS

| | | |
|---|---|---|
| 9,528,171 B2 | 12/2016 | Barnes et al. |
| 2002/0106978 A1 | 8/2002 | Michaud et al. |
| 2009/0212500 A1 | 8/2009 | Kometani |
| 2010/0009141 A1 | 1/2010 | Spangler et al. |
| 2010/0288398 A1 | 11/2010 | Sroka et al. |
| 2013/0059070 A1 | 3/2013 | Spangler et al. |
| 2013/0285332 A1 | 10/2013 | Bishop |
| 2014/0056550 A1 | 2/2014 | Kelsey et al. |
| 2014/0175753 A1 | 6/2014 | Antoine |
| 2015/0197295 A1 | 7/2015 | Feng et al. |
| 2015/0197918 A1 | 7/2015 | Feng et al. |
| 2015/0345642 A1 | 12/2015 | Haas et al. |
| 2016/0067825 A1 | 3/2016 | Vertenten et al. |
| 2016/0067844 A1 | 3/2016 | Kumbera et al. |
| 2016/0076122 A1 | 3/2016 | Barnes et al. |
| 2016/0076128 A1 | 3/2016 | Sordelet et al. |
| 2017/0335969 A1* | 11/2017 | Spangler .............. F16J 15/3496 |

\* cited by examiner

APPLIANCE FOR MAKING ISOTROPICALLY FINISHED SEAL RING OF SEAL ASSEMBLY FOR MACHINE

CROSS-REFERENCE TO RELATED APPLICATIONS

This patent application is a divisional of copending U.S. patent application Ser. No. 16/287,708, filed Feb. 27, 2019, which is incorporated herein by reference in its entirety for all purposes.

TECHNICAL FIELD

This patent disclosure relates generally to a seal ring of a seal assembly for machinery and, more particularly, to a seal ring of a seal assembly having a rotary face-to-face contacting relationship via a pair of seal rings that have been isotropically finished.

BACKGROUND

The seal environment in a machine, such as, an off-highway truck, for example, can include high pressure, high speed, and high deflection between relatively movable components. A seal assembly of the kind employed for retaining lubricant within a sealed cavity and excluding foreign matter from the bearing surfaces between relatively moving parts disposed within the sealed cavity can comprise a face-type seal wherein sealing is accomplished by mating surfaces of relatively rotating seal parts of hard material. In seals which employ two rings relatively rotating in face-to-face contact, the economical production of sealing surfaces which will endure and maintain a seal throughout many hours of severe service is highly desired.

Isotropic finishing is a process which produces a non-directional finish, which can help reduce the surface stress on a machined component. However, a corrosion coating applied to the component can have a tendency to be removed during the isotropic finishing process.

Commonly-owned U.S. Patent Application Publication No. 2017/0335969 is entitled, "Isotropically Finished Seal Ring, Seal Ring Assembly, and Method of Making Seal Ring for Seal Assembly of Machine." The '969 patent application publication is directed to a seal ring for a seal assembly includes a body and a seal flange. The body is generally cylindrical and extends along a longitudinal axis between a load end and a seal end. The seal flange is disposed adjacent the seal end of the body. The seal flange projects radially in circumscribing manner from the body to an outer perimeter thereof. The seal flange includes a sealing face having a sealing band, disposed adjacent the outer perimeter of the seal flange, and an inner relieved area, disposed between the sealing band and an inner perimeter of the seal flange. The sealing band is polished by an isotropic finishing process after a layer of coating composition is applied to at least the body. The layer of coating composition is formulated to withstand the isotropic finishing process and to help increase the corrosion resistance of the seal ring.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect of the present disclosure, there are described embodiments of a method of making a seal ring for a seal assembly includes producing a seal ring. In one embodiment of a method of making a seal ring for a seal assembly, the method of making includes producing the seal ring. The seal ring includes a load end, a seal end, a loading surface, and a sealing face. The load end and the seal end are in spaced relationship to each other along a longitudinal axis. The loading surface extends along the longitudinal axis between the load end and the seal end. The sealing face is disposed at the seal end and is annular. The sealing face extends radially with respect to the longitudinal axis.

A layer of coating composition is applied to at least a portion of an exterior surface of the seal ring. The sealing face of the seal ring is machined to define a sealing band. The sealing band is disposed radially outward of the inner relieved area along the sealing face. After the layer of coating composition is applied, a mask is placed over at least an area of the layer of coating composition applied to the exterior surface of the seal ring. The mask is positioned with respect to the sealing band such that the mask is offset from the sealing band to leave the sealing band exposed. After the mask is placed, the sealing band is polished by subjecting the sealing band to an isotropic finishing process.

In another aspect, the present disclosure describes embodiments of an appliance for use in a method of making an annular seal ring of a seal assembly. In one embodiment, an appliance is described for use in a method of making an annular seal ring of a seal assembly where the annular seal ring has a load end, a seal end, a loading surface, and a sealing face. The loading surface extending axially between the load end and the seal end, the sealing face extends radially at the seal end, and the sealing face has a sealing band. The appliance includes a masking member.

The masking member defines a circumferential groove. The circumferential groove is configured such that the annular seal ring is disposable within the circumferential groove with: the load end being within the circumferential groove, the loading surface being covered by the masking member, and the sealing band being exposed.

Further and alternative aspects and features of the disclosed principles will be appreciated from the following detailed description and the accompanying drawings. As will be appreciated, methods of making a seal ring for a seal assembly and appliance for use in methods of making an annular seal ring of a seal assembly disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
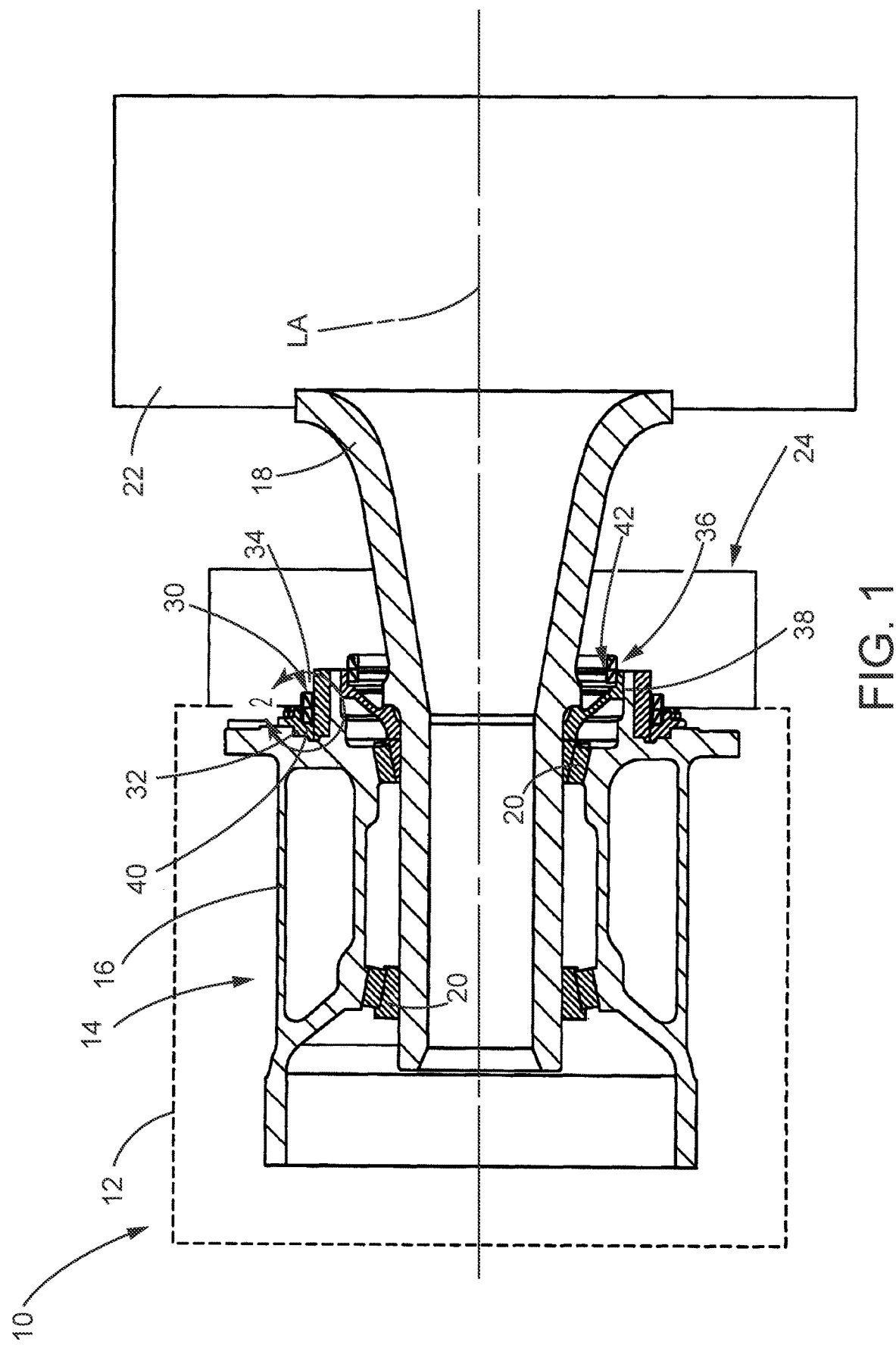
FIG. 1 is a partially-sectioned, diagrammatic side view of an embodiment of a machine having an embodiment of a seal assembly constructed in accordance with principles of the present disclosure.

Embodiments of a seal assembly, a seal ring for a seal assembly, a method of making a seal ring for a seal assembly, and an appliance for use in a method of making an annular seal ring of a seal assembly are described herein. In embodiments, a seal ring for a seal assembly can include a sealing face having a sealing band disposed adjacent an outer perimeter thereof. The sealing band can be annular and substantially flat in cross-section between an inner radial edge and the outer perimeter. In embodiments, the sealing face can include an inner relieved area which is located between the sealing band and an inner perimeter of the seal ring. The sealing band can be isotropically finished.

In embodiments, the sealing face can be polished using any suitable isotropic finishing technique. In embodiments, the sealing band can be isotropically finished such that the sealing band has a consistent surface finish with a surface roughness average of 0.3 micrometers Ra or less. In embodiments, the sealing face of the seal ring can be prepared without the use of any polishing steps in addition to the isotropic finishing process, such as one using sandpaper or the like.

In embodiments, a layer of coating composition is applied to at least a portion of an exterior surface of a body of the seal ring to help increase the corrosion resistance of the seal ring. In embodiments, the sealing band is polished by subjecting the sealing band to an isotropic finishing process after the layer of coating composition is applied. In embodiments, the layer of coating composition is applied to the exterior surface of the body of the seal ring to help protect the surface metrology of the exterior surface underlying the layer of coating composition from the isotropic finishing process. For example, in embodiments, the layer of coating composition is applied to at least a portion of an exterior surface of the seal ring to help increase the corrosion resistance of the seal ring.

In embodiments, the layer of coating composition is applied to the seal ring prior to the seal ring being subjected to the isotropic finishing process. In embodiments, the layer of coating composition is applied to the seal ring using any suitable technique, such as an autodeposition process, an electro-deposition process, or a plating process (e.g., an electroplating process or an electroless plating process).

In embodiments, a mask is placed over at least an area of an exterior surface of the seal ring prior to the seal ring being subjected to the isotropic finishing process. In embodiments, a layer of coating composition is applied to the seal ring and the mask is placed over at least an area of the layer of coating composition applied to the exterior surface of the seal ring prior to the seal ring being subjected to the isotropic finishing process.

In embodiments, the mask can be made of any suitable material, such as a material that is relatively soft and flexible for easy seal ring installation within a seal ring groove defined in the mask. For example, in embodiments, the mask can be made from a material having a durometer hardness of 60 Shore A or less. In embodiments, the mask is made from a material that is acid resistant and non-reactive with the chemicals and polishing media used during the isotropic finishing process. In embodiments, the mask can be made using any suitable technique. In embodiments, the mask can be made by inverse molding a prototype seal ring. By masking portions of the seal ring that are not meant to be isotropically finished, the mask helps protect the layer of coating composition applied to the seal ring that is intended to remain after the isotropic finishing process is completed.

Referring now to the drawings and in particular to FIG. 1, an embodiment of a machine 10 is shown schematically. The machine 10 include a housing or frame 12 having a wheel assembly 14 coupled therewith. The wheel assembly 14 includes a hub 16, a spindle 18 journaled with the hub 16 via bearings 20, and a wheel 22. The machine 10 includes a brake system 24 which is arranged with the wheel assembly 14 and configured to selectively stop the rotation of the wheel 22.

A seal assembly 30 constructed according to principles of the present disclosure can provide a running seal between a first member 32 which is mounted to the hub 16 of the wheel assembly 14 and a second member 34 which is in the form of a brake housing of the brake system 24. The brake housing 34 is arranged such that the brake housing 34 is rotatable with respect to the first member 32 about a rotational axis which is aligned with a longitudinal axis "LA" defined by the spindle 18. The seal assembly 30 is disposed between the first member 32 and the second member 34.

A second seal assembly 36 constructed according to principles of the present disclosure is provided to form a second running seal between a different pair of first and second members 38, 34 of the machine 10 which are rotatable with respect to each other about a longitudinal axis "LA." In embodiments, the first and second seal assemblies 30, 36 can be substantially the same. In yet other embodiments, the second seal assembly 36 can be different from the first seal assembly 30.

The first seal assembly 30, which is in the form of a metal-to-metal face seal assembly, is disposed in a first seal cavity 40 axially extending between the first member 32 and the second member 34. The second member 34 in the form of the brake housing is rotatable about the longitudinal axis "LA" relative to the first member 32 with the first seal assembly 30 providing a running seal therebetween. The second seal assembly 36 is similarly disposed in a second seal cavity 42. In embodiments, the first and second seal assemblies 30, 36 can be used to retain brake cooling fluid and/or a lubricant. In other embodiments, a seal assembly constructed according to principles of the present disclosure can be used in other applications, as will be recognized by one skilled in the art.

In embodiments, the machine 10 can be any suitable machine, such as a wheel loader, a backhoe, an excavator, a material handler and the like. In embodiments, the machine 10 comprises other types of equipment that include pivotal linkage arrangements which utilize a seal ring, a seal assembly, and a joint having a seal assembly constructed in accordance with principles of the present disclosure. Examples of other such machines include machines used for compaction, mining, construction, farming, transportation, etc. While the present disclosure may be implemented in the context of a wheel assembly, it is not thereby limited. A wide variety of other applications are contemplated, including various components of track-type tractors such as track seals, track roller and carrier roller seals, pin joint assemblies and cartridges, final drive arrangements, auger drive/support arrangements, and other suitable machine systems wherein rotatable seal assemblies are utilized.

The first and second members 32, 34 can be rotatable relative to one another about the longitudinal axis "LA" with the seal assembly 30 providing a means for fluidly sealing the first member 32 and the second member 34 with a running seal therebetween. In embodiments, the first member 32 can comprise a component mounted to the frame 12 or otherwise stationary with respect to the frame 12, and the second member 34 can comprise a component which is rotatably movable with respect to the first member 32 about the longitudinal axis "LA." In other embodiments, the second member 34 can be stationary and the first member 32 is rotatable with respect to the frame 12. It should be understood, however, that the use of the terms "first," "second," and the like herein is for convenient reference only and is not limiting in any way.

The illustrated first and second seal assemblies 30, 36 are substantially identical to each other. It should be understood, therefore, that the description of one seal assembly is applicable to the other seal assembly, as well.

Figure 2:
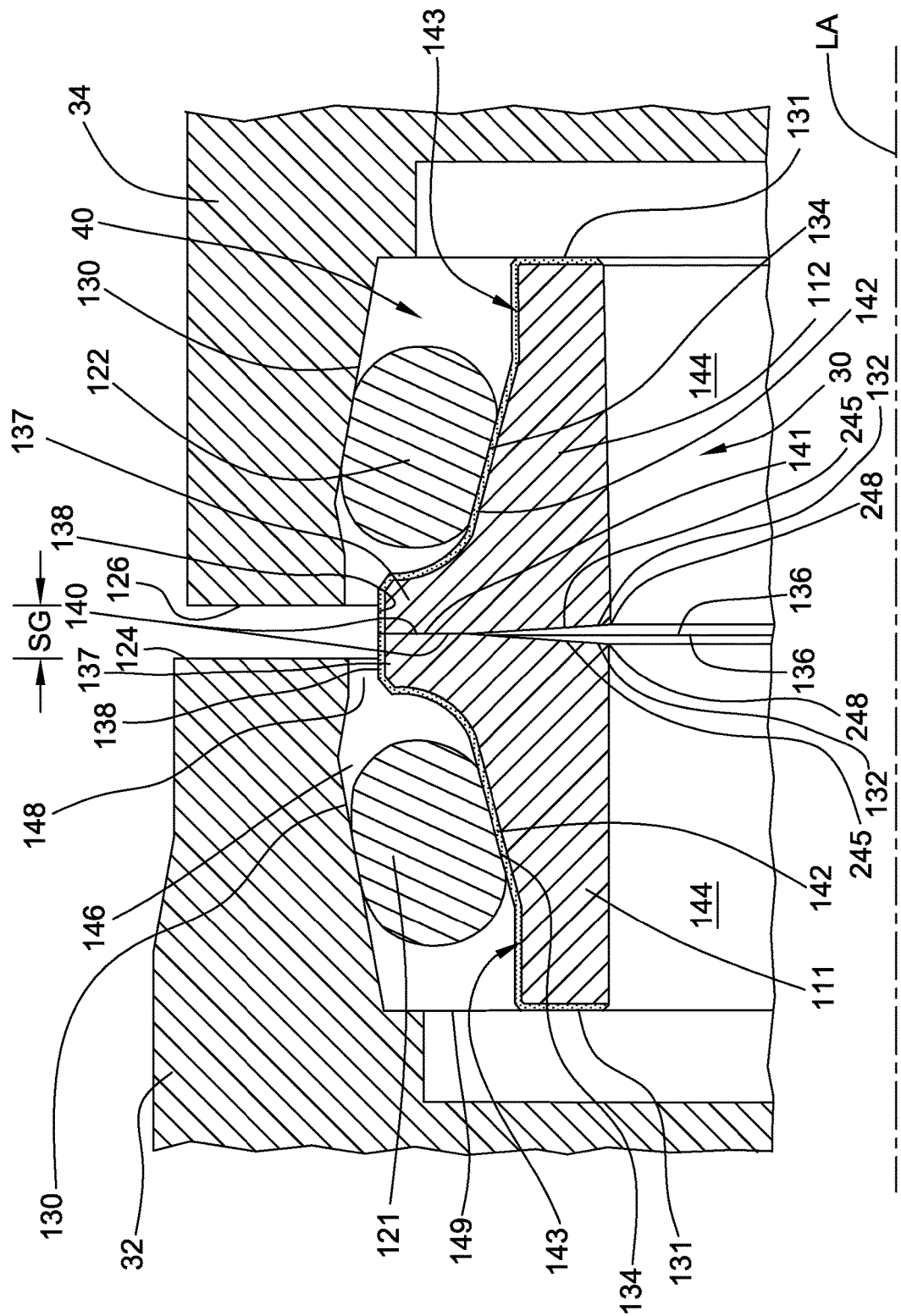
FIG. 2 is an enlarged, sectioned diagrammatic view of the seal assembly, corresponding to the location encompassed by circle II in FIG. 1.

Referring to FIG. 2, the first seal assembly 30 is shown. The first member 32 is rotatable about the longitudinal axis "LA" with respect to the second member 34. The first member 32 and the second member 34 are disposed in spaced relationship to each other such that they are separated by a seal gap distance "SG" along the longitudinal axis "LA." During use, the first member 32 and the second member 34 can move axially with respect to each other along the longitudinal axis "LA," thereby varying the seal gap distance "SG."

The first seal assembly 30 includes first and second seal rings 111, 112 and first and second load rings 121, 122, which are all annular. The first and second seal rings 111, 112 and the first and second load rings 121, 122 are disposed in the first seal cavity 40 between the first member 32 and the second member 34. The first and second seal rings 111, 112 of the first seal assembly 30 are disposed in abutting relationship with each other. The first and second load rings 121, 122 are respectively mounted to the first and second seal rings 111, 112. The first and second seal rings 111, 112 can be made from any suitable material, such as a suitable metal, including a ferrous alloy, for example. The first and second load rings 121, 122 are preferably made from a suitable elastomeric material (e.g., nitrile, low temperature nitrile, hydrogenated nitrile (HNBR), silicone, or viton).

In the first seal assembly 30, the first load ring 121 acts as a gasket and sealingly engages the first member 32 and the first seal ring 111 to provide a fluid-tight seal therebetween. The second load ring 122 acts as a gasket and sealingly engages the second member 34 and the second seal ring 112 to provide a fluid-tight seal therebetween.

An outboard end portion 124 of the first member 32 is in proximal relation to an inboard end portion 126 of the second member 34. The outboard end portion 124 of the first member 32 and the inboard end portion 126 of the second member 34 each includes a load ring engagement surface 130. The load ring engagement surfaces 130 of the first member 32 and the second member 34 define, at least in part, the first seal cavity 40, which extends axially and is interposed between the first member 32 and the second member 34. It will be understood that the members 38, 34 cooperate in a similar manner to define, at least in part, the second seal cavity 42.

The load ring engagement surfaces 130 are generally annular and are coaxial with the longitudinal axis "LA." In the illustrated embodiment, the load ring engagement surfaces 130 maintain the cross-sectional shape shown in FIG. 2 substantially continuously around the entire circumference circumscribed around the longitudinal axis "LA" by the first and second members 32, 34.

The first and second seal rings 111, 112 are substantially identical to each other. The first and second seal rings 111, 112 are each in the form of an annulus. The first and second seal rings 111, 112 are rotationally movable with respect to each other about the longitudinal axis "LA." In this arrangement, the first seal ring 111 can be considered a stationary seal ring as it is rotatively coupled with the first member 32. The second seal ring 112 can be considered a rotational seal ring as it is coupled with the second member 34 which can rotate relative to the first member 32 about the longitudinal axis "LA."

The first and second seal rings 111, 112 each has a load end 131 and a seal end 132 in spaced relationship to each other along the longitudinal axis "LA," a ramped or inclined loading surface 134, which is axially extending, and a sealing face 136, which is disposed at the seal end 132 and extends radially with respect to the longitudinal axis "LA." The first seal ring 111 and the second seal ring 112 abut one another such that the sealing faces 136 of the first seal ring 111 and the second seal ring 112 are in contacting relationship with each other.

The sealing face 136 is defined by a seal flange 137, which is radially-extending. The sealing faces 136 of the first and second seal rings 111, 112 form a radially-extending annulus and are in sealing relationship with each other.

Each sealing face 136 extends radially to an outer perimeter 138. Each sealing face 136 has a sealing band 140 disposed adjacent the outer perimeter 138. The first and second seal rings 111, 112 abut one another such that the sealing bands 140 of the first and second seal rings 111, 112 are in contacting relationship with each other.

The first and second load rings 121, 122 are respectively mounted to the first and second seal rings 111, 112. The first and second load rings 121, 122 resiliently support the first and second seal rings 111, 112, respectively. The first annular load ring 121 engages the loading surface 134 of the first annular seal ring 111, and the second annular load ring 122 engages the loading surface 134 of the second annular seal ring 112.

The first seal assembly 30 employs dual cones in the form of the first and second seal rings 111, 112. Axial loading of the first and second seal rings 111, 112 along the longitudinal axis "LA" is accomplished by means of the first and second load rings 121, 122. The tapered conical or inclined loading surfaces 134 are formed along the outside surface of the first and second seal rings 111, 112 to receive the first and second load rings 121, 122, respectively. The load ring engagement surfaces 130 of the first and second members 32, 34 are positioned in corresponding, confronting inclined relation with the inclined loading surfaces 134 of the first and second seal rings 111, 112 so as to contain the first and second load rings 121, 122, respectively, therebetween. Axial loading of the first and second seal rings 111, 112 is thus accomplished through the axial loading of the first and second load rings 121, 122, respectively.

The first load ring 121 is compressed such that it engages the load ring engagement surface 130 of the first member 32 and the inclined loading surface 134 of the first seal ring 111. The second load ring 122 is compressed such that it engages the load ring engagement surface 130 of the second member 34 and the inclined loading surface 134 of the second seal ring 112. The first and second load rings 121, 122 are positioned such that they resiliently support the first and second seal rings 111, 112 and drive the sealing faces 136 of the first and second seal rings 111, 112 together to define a band 141 of contact between the sealing bands 140. The first and second load rings 121, 122 act in the manner of a spring to apply an axial load respectively against the first and second seal rings 111, 112 in opposing directions along the longitudinal axis "LA" to bring the sealing faces 136 of the first and second seal rings 111, 112 into face-to-face sealing contact under pressure along the band 141 of contact such that a running, fluid-tight seal is formed.

In embodiments, the sealing band 140 of both of the first annular seal ring 111 and the second annular seal ring 112 is isotropically finished. An isotropic finish is one in which defects are generally non-directional, or invariant in all directions, in contrast to directional defects, such as, machine marks, for example. In embodiments, the sealing bands 140 of the first and second seal rings 111, 112 can be isotropically finished such that each sealing band 140 has a non-periodic or randomized surface texture as will be appreciated by one skilled in the art. In embodiments, the sealing band 140 of both of the first annular seal ring 111 and the second annular seal ring 112 is isotropically finished such that the sealing band 140 has a surface roughness average of about 0.3 micrometers Ra or less, and has a surface roughness average of about 0.2 micrometers Ra or less in some embodiments and 0.15 micrometers Ra or less in still other embodiments. In embodiments, at least substantially the entire sealing face 136 of both of the first annular seal ring 111 and the second annular seal ring 112 is isotropically finished. In embodiments, any suitable technique can be used to isotropically finish the sealing bands 140 of the first and second annular seal rings 111, 112 to achieve a desired degree of polished surface smoothness.

In embodiments, the first annular seal ring and the second annular seal ring both include a layer 142 of coating composition applied to at least a portion of the loading surface 134. In the illustrated embodiment, the layer 142 of coating composition of each of the first and second annular seal rings 111, 112 substantially covers an outer exterior surface 143 of both the first and second annular seal rings 111, 112. In embodiments, the layer 142 of coating composition can be applied to at least a portion of an internal cylindrical surface 144 of each of the first and second annular seal rings 111, 112. The layers 142 of coating composition illustrated in FIG. 2 are not necessarily depicted to scale but rather for explanatory purposes only.

Any suitable technique can be used to apply the layer 142 of coating composition. For example, in embodiments, the layer 142 of coating composition is applied using at least one of an autodeposition process, an electro-deposition process, and a plating process (e.g., an electroplating process or an electroless plating process).

In embodiments, the layer 142 of coating composition of both of the first annular seal ring 111 and the second annular seal ring 112 is applied before the sealing bands 140 are isotropically finished, and the coating composition is formulated to withstand the isotropic finishing process used to polish the sealing bands 140. In embodiments, the coating composition can be made from a material that has an enhanced property or characteristic relative to the material from which the seal ring is made. For example, in embodiments, each of the first and second seal rings 111, 112 is made from a seal ring material, and the respective layers 142 of coating composition are more corrosion resistant than the seal ring material. In embodiments, the coating composition includes a material possessing a rust preventative characteristic.

In embodiments, the layer 142 of coating composition is applied using an autodeposition process, and the layer 142 of coating composition comprises an epoxy. In embodiments, the layer 142 of coating composition comprises an epoxy-acrylic resin.

In embodiments, the layer 142 of coating composition comprises a suitable autodepositable coating composition, including, for example, a coating composition marketed under the brand name Autophoretic® or Autophoretic Coating Chemicals® by Henkel Surface Technologies. In embodiments, the autodepositable coating composition comprises an Autophoretic® coating composition including an epoxy-acrylic based resin. In embodiments, the autodepositable coating composition comprises a coating composition marketed by Henkel Surface Technologies as Bonderite Metal Pre-treatment Paint Process (BONDERITE M-PP) 930. In yet other embodiments, the layer 142 of coating composition can comprise other suitable autodepositable coating compositions.

In still other embodiments, the layer 142 of coating composition comprises a suitable phosphate coating. For example, in embodiments, layer 142 of coating composition comprises a manganese phosphate coating material. In embodiments, any suitable phosphate coating process can be used to apply the layer of coating composition which comprises a phosphate material.

The load ring engagement surfaces 130 of the first member 32 and the second member 34 are mirror images. The loading surfaces 134 of the first and second seal rings 111, 112 are substantially identical to each other. Accordingly, it should be understood that the description below of the load ring engagement surface 130 of the first member 32 and the loading surface 134 of the first seal ring 111 is applicable respectively to the load ring engagement surface 130 of the second member 34 and the loading surface 134 of the second seal ring 112, as well. Also, it should be understood that the foregoing description of the loading surface 134 contemplates that the layer 142 of coating composition can be applied thereto and can be considered to be a part of the loading surface 134. Furthermore, the description of the relationships between the first member 32, the first load ring 121, and the first seal ring 111 are also applicable to the relationships between the second member 34, the second load ring 122, and the second seal ring 112, as well.

The load ring engagement surface 130 of the first member 32 and the inclined loading surface 134 of the first seal ring 111 are in confronting, spaced apart relationship such that they define an annular load ring cavity 146 within which the first load ring 121 is disposed. The load ring engagement surface 130 of the first member 32 and the inclined loading surface 134 of the first seal ring 111 cooperate together to define a seal end restriction 148 adjacent the sealing face 136 of the first seal ring 111. The seal end restriction 148 is configured to help prevent the first load ring 121 from sliding axially off of the first seal ring 111 in a direction toward the second seal ring 112 and to help prevent the first load ring 121 from extending into a pinch point therein. The load end 131 of the first seal ring 111 cooperates with the first member 32 to define a load end restriction 149.

Figure 3:
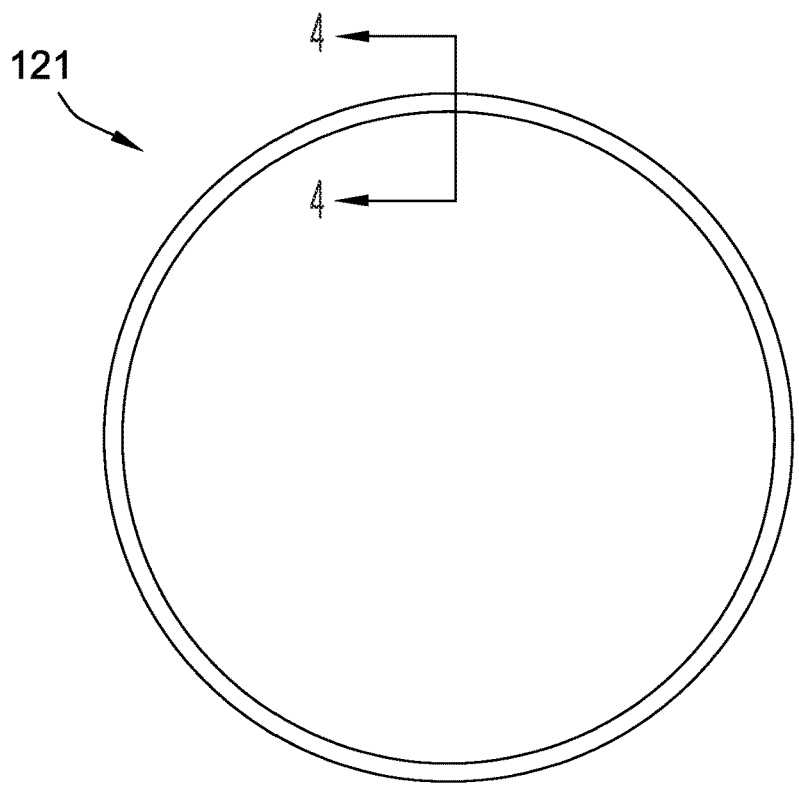
FIG. 3 is an axial end view of a load ring of the seal assembly of FIG. 2 in an unloaded condition.
Figure 4:
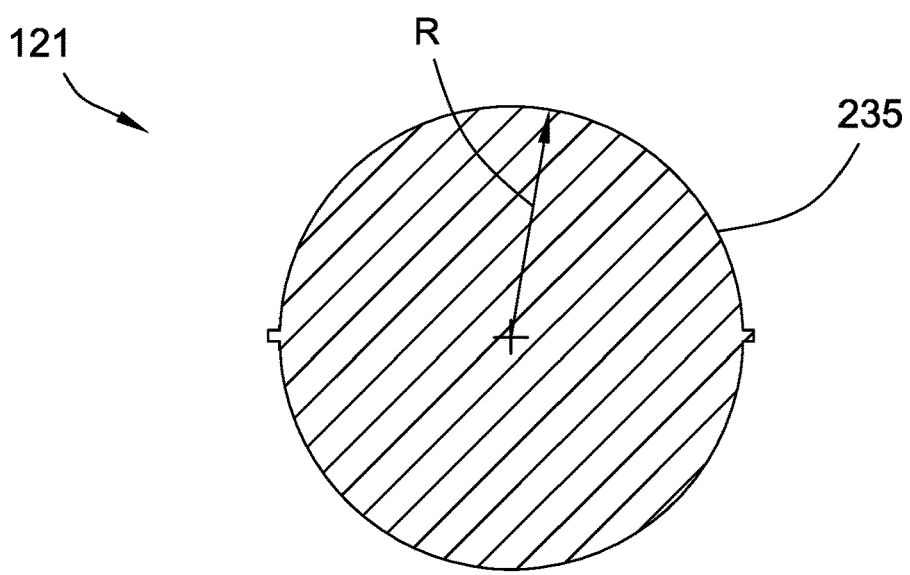
FIG. 4 is an enlarged, cross-sectional view taken along line IV-IV in FIG. 3.

Referring to FIGS. 3 and 4, the first load ring 121 is shown. The first and second load rings 121, 122 are substantially identical to each other. It should be understood, therefore, that the description of the first load ring 121 is applicable to the second load ring 122. The first load ring 121 is in the shape of an annulus. When the first load ring 121 is in an unloaded or uncompressed condition, it has a substantially circular cross-sectional shape 235, as shown in FIG. 4. The cross-sectional shape 235 has a predetermined cross-sectional radius "R" when in an unloaded condition (see FIG. 4).

Figure 6:
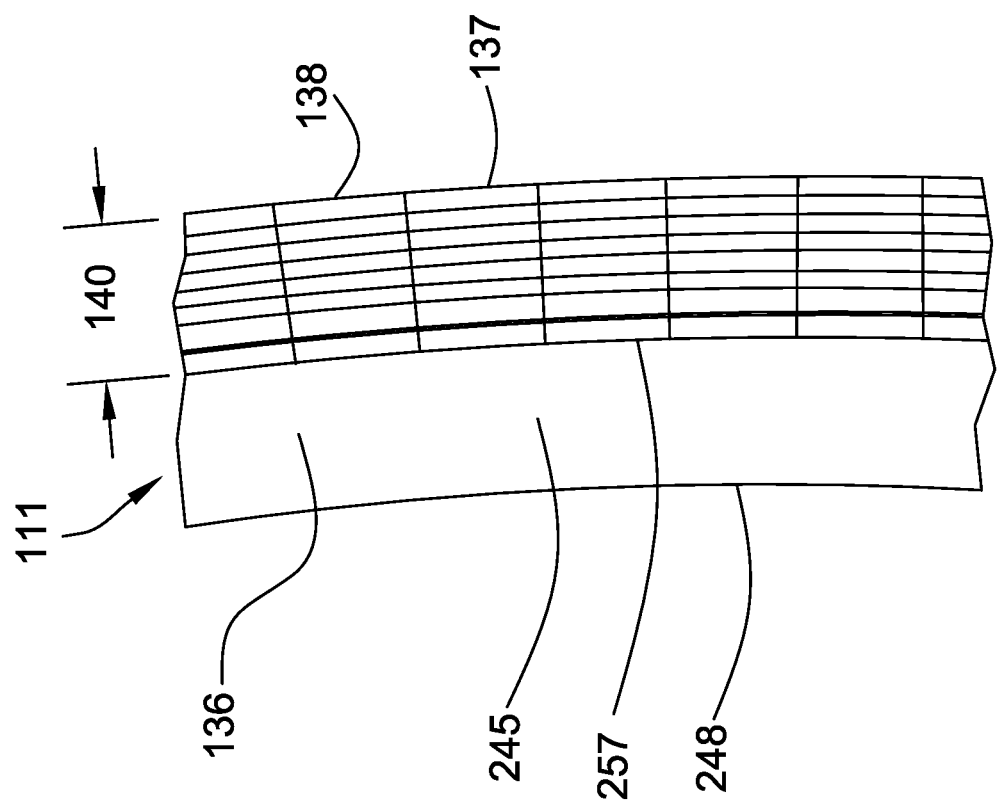
FIG. 6 is an enlarged, fragmentary view of the seal ring of FIG. 5 corresponding to the location encompassed by oval VI in FIG. 5.
Figure 5:
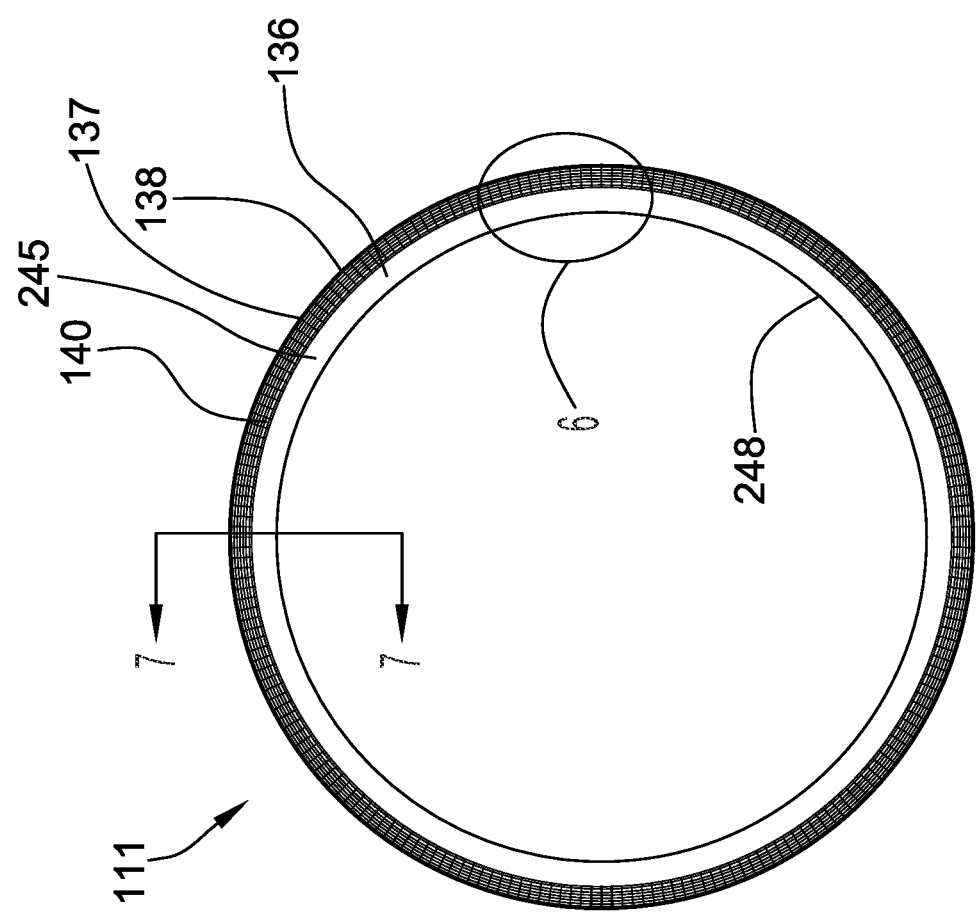
FIG. 5 is an axial end view of a seal ring of the seal assembly of FIG. 2.
Figure 7:
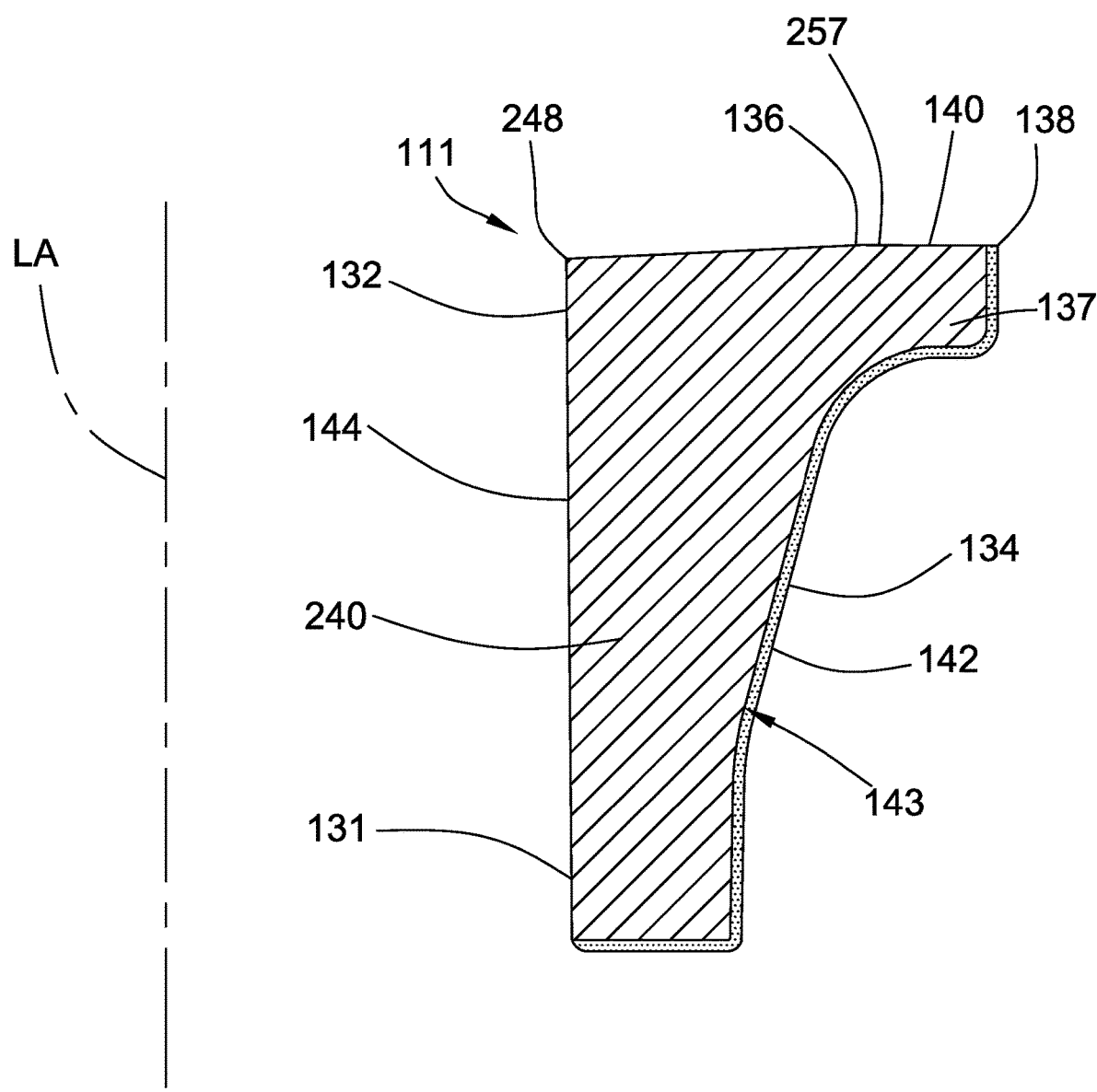
FIG. 7 is an enlarged, cross-sectional view taken along line VII-VII in FIG. 5.

Referring to FIGS. 5-7, the first seal ring 111 is shown. The first seal ring 111 is an example of an embodiment of a seal ring constructed according to principles of the present disclosure. The second seal ring 112 is substantially identical to the first seal ring 111. It should be understood, therefore, that the description of the first seal ring 111 is applicable to the second seal ring 112, as well.

Referring to FIGS. 5 and 6, the first seal ring 111 is in the shape of an annulus. The seal flange 137 includes the sealing face 136. The sealing face 136 includes the sealing band 140 disposed adjacent the outer perimeter 138 of the seal flange 137 and an inner relieved area 245 disposed between the sealing band 140 (with its isotropic finish being shown as a hatched area in FIGS. 5 and 6 for illustrative purposes) and an inner perimeter 248 of the first seal ring 111. The inner relieved area 245 can be tapered between the sealing band 140 and the inner perimeter 248 such that the inner perimeter 248 is axially displaced from the sealing band 140 (see FIG. 2).

In embodiments, the sealing band 140 of the first seal ring 111 is isotropically finished such that the sealing band 140 has a surface roughness average of about 0.3 micrometers Ra or less. In other embodiments, the sealing band 140 of the first seal ring 111 is isotropically finished such that the sealing band 140 has a surface roughness average of about 0.3 micrometers Ra or less, and has a surface roughness average of about 0.2 micrometers Ra or less in some embodiments, a surface roughness average of about 0.15 micrometers Ra or less in still other embodiments, and of about 0.1 micrometers Ra or less in yet other embodiments. In embodiments, at least a portion of the inner relieved area 245 of the sealing face 136 is also isotropically finished along with the sealing band 140. In embodiments, substantially the entire sealing face 136 of the first seal ring 111 is isotropically finished.

The surface roughness average can be computed using any suitable technique known to those skilled in the art. For example, in one arrangement, the surface roughness average (Ra) of the sealing band 140 can be determined using a profilometer set up with a 0.25 mm cutoff and evaluated for five cutoff lengths. The first seal ring 111 can be checked in at least three locations at predetermined locations and/or about 120° circumferentially apart from each other. The traverse direction of the measurement surface traces can be perpendicular to the direction of any initial machine or directional wear marks.

Referring to FIG. 7, the first seal ring 111 includes a body 240 and the seal flange 137. The body 240 is generally cylindrical and extends along the longitudinal axis "LA" between the load end 131 and the seal end 132, which is in opposing relationship to the load end 131. The cylindrical body 240 can extend radially between the inner perimeter 248 and the internal cylindrical surface 144, which is substantially cylindrical, and the majority of the inclined loading surface 134, which is in outer, radial spaced relationship to the inner perimeter 248.

In embodiments, the layer 142 of coating composition is applied to at least a portion of the exterior surface 143 of the body 240. In the illustrated embodiment, the layer 142 of coating composition is applied to substantially the entirety of the exterior surface 143 of the body 240.

The seal flange 137 is disposed adjacent the seal end 132. The seal flange 137 circumscribes the body 240 and projects radially from the cylindrical body 240 to the outer perimeter 138 thereof. The sealing face 136 is disposed on the seal flange 137 and extends radially with respect to the longitudinal axis "LA." The sealing band 140 can be substantially flat in cross-section between an inner radial edge 257 and the outer perimeter 138 (see FIG. 6 also). In embodiments, the sealing band 140 can include an outer relieved area disposed adjacent the outer perimeter 138 that is chamfered or tapered.

It should be understood that in other embodiments, a seal ring constructed according to principles of the present disclosure can have a different configuration from that of the seal rings 111, 112 illustrated in FIGS. 2 and 5-7, such as, heavy duty dual face metal face seals using Belleville washers; other types of duo-cone seal rings with different loading surfaces and/or sealing faces and/or used in conjunction with different shaped load rings or torics; and other seals for other seal assemblies, as will be appreciated by one skilled in the art.

A seal ring constructed according to principles of the present disclosure can be made using any suitable technique known to those skilled in the art. For example, a seal ring blank or "button" can be made by any suitable technique, such as by being stamped and formed, or cast, for example. The seal ring button can be machined by any suitable technique, such as by using a lathe for lathe-turning and/or grinder for grinding operations, for example, to achieve the desired configuration for the seal ring. The seal ring can be machined such that the thickness of the seal flange is within a predetermined tolerance, the seal ramp angle is within a predetermined tolerance, and other dimensional tolerances are met, for example. It should be understood that dimensional details relating to the seal ring, and other components of a seal assembly, constructed according to principles of the present disclosure as described herein are nominal values. It is contemplated that suitable tolerance variations are also included within the described nominal values, as will be appreciated by one skilled in the art.

Figure 8:
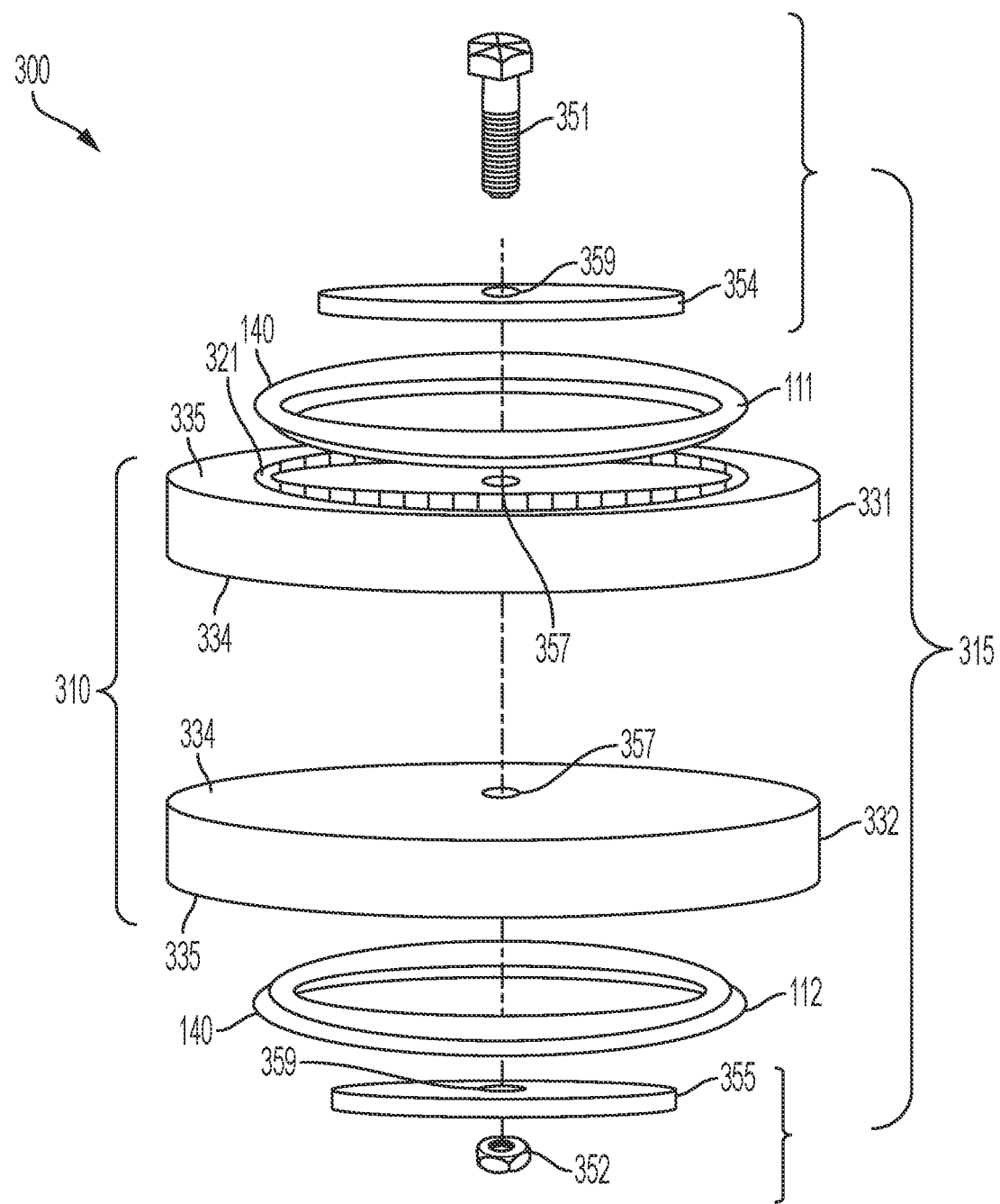
FIG. 8 is an exploded view of an embodiment of an appliance for use in a method of making an annular seal ring of a seal assembly, the appliance being constructed in accordance with principles of the present disclosure.
Figure 9:
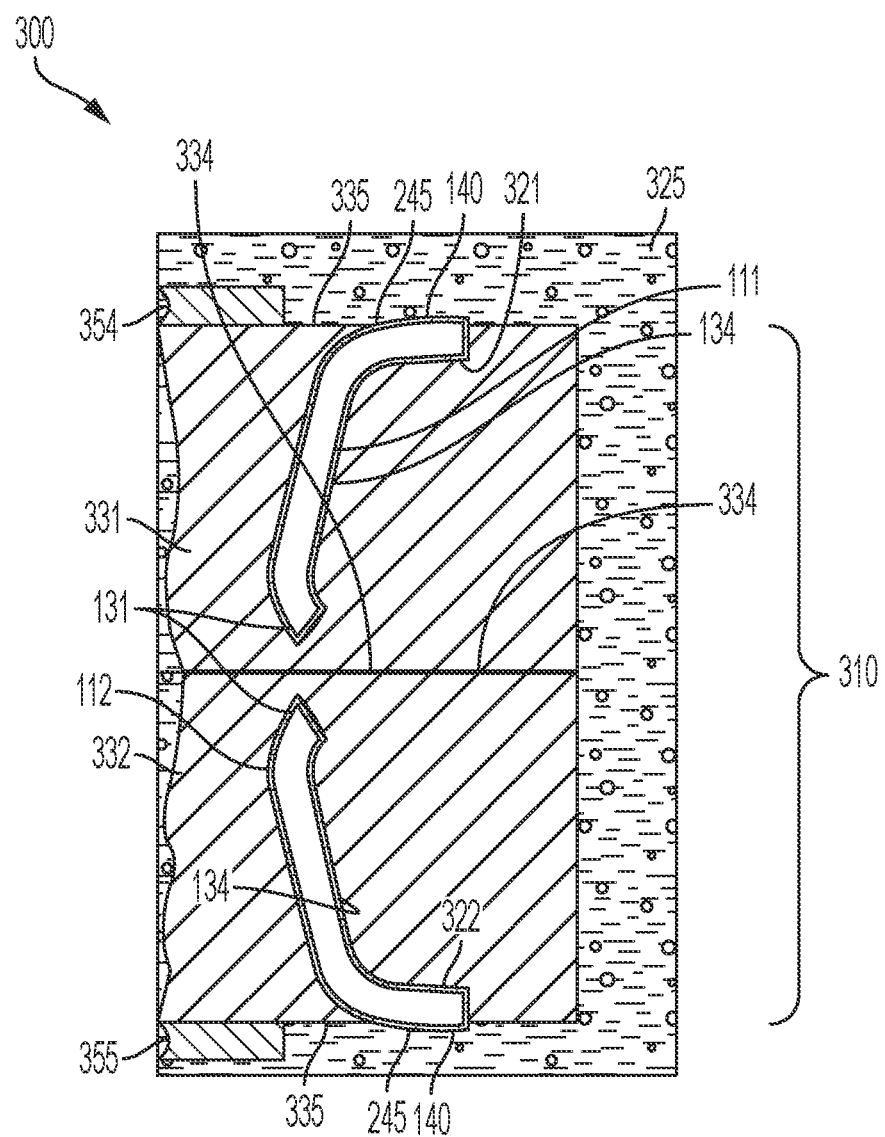
FIG. 9 is a sectional view of the appliance of FIG. 8.

Referring to FIGS. 8 and 9, an embodiment of an appliance (or mask) 300 is shown, which is for use in a method of making an annular seal ring of a seal assembly, and is constructed according to principles of the present disclosure. Embodiments of an appliance constructed according to principles of the present disclosure can be used in a method of making a seal ring for a seal assembly following principles of the present disclosure to make a seal ring with an isotropically finished seal band as discussed herein. In embodiments, any embodiment of an appliance according to principles discussed herein can be used in a method of making a seal ring for a seal assembly following principles of the present disclosure. An appliance constructed according to principles of the present disclosure can be used in a method of manufacturing a seal ring to mask a portion of the outer surface of the sealing ring to protect the corrosion resistant coating applied on the outer surface of the sealing ring during isotropic finishing, yet allowing the sealing band to be polished via the isotropic finishing process.

Referring to FIG. 8, the appliance 300 includes a masking member 310 and a connector assembly 315. The masking member 310 can be placed over at least an area of the layer of coating composition applied to the exterior surface of a seal ring. In embodiments, the masking member 310 can be configured such that the masking member 310 is positionable with respect to a sealing band of a seal ring such that the masking member 310 is offset from the sealing band to leave the sealing band exposed.

The masking member 310 of FIGS. 8 and 9 defines therein first and second circumferential grooves 321, 322 configured to receive respectively therein the first and second seal rings 111, 112 such that the sealing band 140 of both of the seal rings 111, 112 disposed within the masking member 310 are exposed and can be isotropically finished at the same time (see also, FIG. 9) in a process using a polishing media 325. In other embodiments, the masking member 310 can be configured to define a single circumferential groove or more than two circumferential grooves as desired.

In the illustrated embodiment, the first and second circumferential grooves 321, 322 have substantially the same configuration such that the first and second seal rings 111, 112 can be interchangeably disposed therein. In other embodiments, the first and second circumferential grooves 321, 322 can have configurations that are different from each other.

In embodiments, the masking member 310 defines at least one circumferential groove configured such that the load end of the seal ring is disposable within the circumferential groove. In embodiments, the masking member 310 defines at least one circumferential groove configured that the seal ring is disposable within the circumferential groove with the loading surface being covered and only a part of the sealing face containing the sealing band being exposed. In embodiments, the masking member 310 defines at least one circumferential groove configured such that the seal ring is disposable within the circumferential groove with: the load end being within the circumferential groove, the loading surface being covered by the masking member, and the sealing band being exposed. In embodiments, the masking member 310 defines at least one circumferential groove configured such that the seal ring is disposable within the circumferential groove with at least a portion of the inner relieved area 245 is exposed. In the illustrated embodiment, the first and second circumferential grooves 321, 322 of the masking member 310 are configured such that the first and second seal ring 111, 112 are respectively disposable within the circumferential grooves 321, 322 with the load end 131 being within the respective circumferential groove 321, 322, the loading surface 134 being covered by the masking member, and the sealing band 140 and a portion of the inner relieved area 245 being exposed.

In embodiments, the masking member 310 can be made from any suitable material. In embodiments, the masking member 310 is made from an acid-resistant material that is non-reactive with a predetermined polishing media for an isotropic finishing process.

In embodiments, the masking member 310 is made from a soft material, such as, one having a durometer hardness of 60 Shore A or less, to facilitate the insertion of a seal ring into the circumferential groove (or grooves) defined therein. In embodiments, the masking member 310 is made from a material having a durometer hardness in a range between 20 and 60 Shore A, and in a range between 20 and 45 Shore A in other embodiments. In embodiments, the masking member 310 is made from a suitable rubber material. In embodiments, the masking member 310 is made from a suitable silicone material, such as, a suitable silicone rubber that undergoes high-temperature vulcanization or one that undergoes room-temperature vulcanization. In embodiments, the masking member 310 is made from a silicone material that is a pourable, addition-curing, two-component silicone rubber that vulcanizes at room temperature, for example, one commercially-available from Wacker Chemie AG of Germany under the tradename Elastosil®, such as, Elastosil® M 4601. In yet other embodiments, the masking member 310 is made from a material having a hardness greater than 60 Shore A, such as a hard plastic or metal, for example. In embodiments, the circumferential grooves 321, 322 can be configured in such a way as to receive therein the seal rings 111, 112, respectively, with the masking member 310 flexing within an acceptable limit of the material from which the masking member 310 is made during the seal ring insertion sequence.

In embodiments, the masking member 310 can be made using any suitable technique, as will be appreciated by one skilled in the art. In embodiments, the masking member 310 can be made by inverse molding of a prototype seal ring (or rings) such that each circumferential groove 321, 322 defined therein has a shape that is complementary to the exterior surface of seal ring that it is intended to mask. In such an inverse molding technique, the finished masking member can be shaped such that the sealing band of the prototype seal ring is exposed when the prototype seal ring is inserted into the mating circumferential groove defined by the masking member.

Referring to FIG. 8, the illustrated masking member 310 includes a first portion 331 and a second portion 332. The first portion 331 and the second portion 332 have substantially the same construction. Each of the first portion 331 and the second portion 332 includes a base 334 and a face 335. The face 335 of the first portion 331 defines the first circumferential groove 321, and the face 335 of the second portion 332 defines the second circumferential groove 322 (see FIG. 9).

The connector assembly 315 is configured to removably connect the first portion 331 and the second portion 332 together such that the base 334 of the first portion 331 and the base 334 of the second portion 332 are in abutting relationship to each other, and the face 335 of the first portion 331 and the face 335 of the second portion 332 are in outward opposing relationship to each other. The connector assembly 315 of FIGS. 8 and 9 includes a threaded fastener 351, a nut 352, and a pair of backing plates 354, 355. Each of the first portion and the second portion and the pair of backing plates 354, 355 can define therein a respective central opening 357, 359 configured to accommodate the threaded fastener 351 therethrough. The nut 352 can be threadingly mounted to the threaded fastener 351 to secure the backing plates 354, 355 and the first and second portions 331, 332 together.

The connector assembly 315 can be arranged such that the first portion 331 and the second portion 332 are interposed between the pair of backing plates 354, 355. The first portion 331 and the second portion 332 can be disposed in abutting relationship as described above. The backing plates 354, 355 can be configured to help provide rigidity to the first and second portions 331, 332, which are made from a flexible, soft material, so the first and second portions 331, 332 do not bend excessively during the isotropic finishing process to allow the seal rings 111, 112 disposed therein to fall out. The backing plates 354, 355 can be made from a suitable metal, such as steel, for example.

Figure 10:
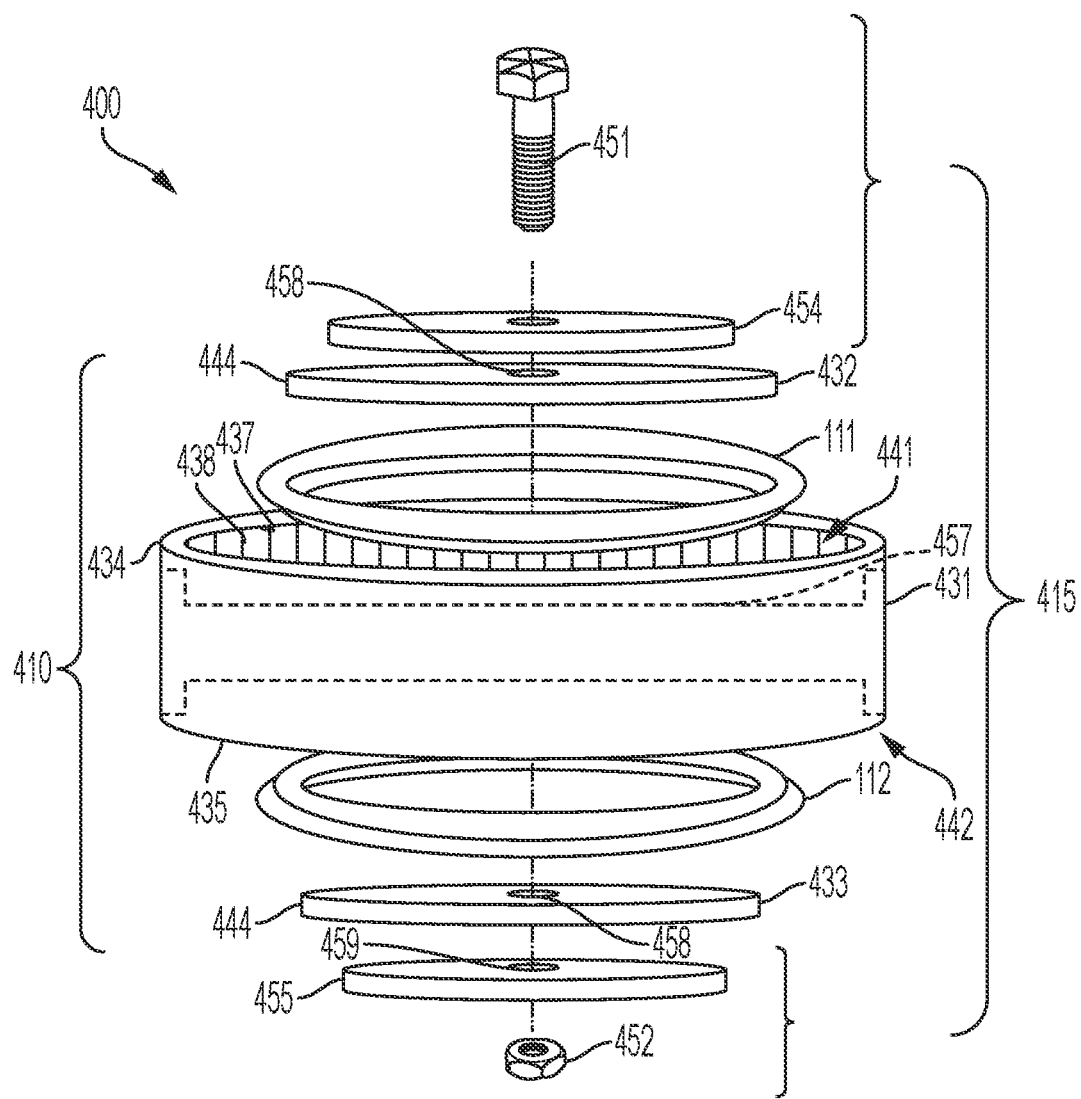
FIG. 10 is an exploded view of another embodiment of an appliance for use in a method of making an annular seal ring of a seal assembly, the appliance being constructed in accordance with principles of the present disclosure.
Figure 11:
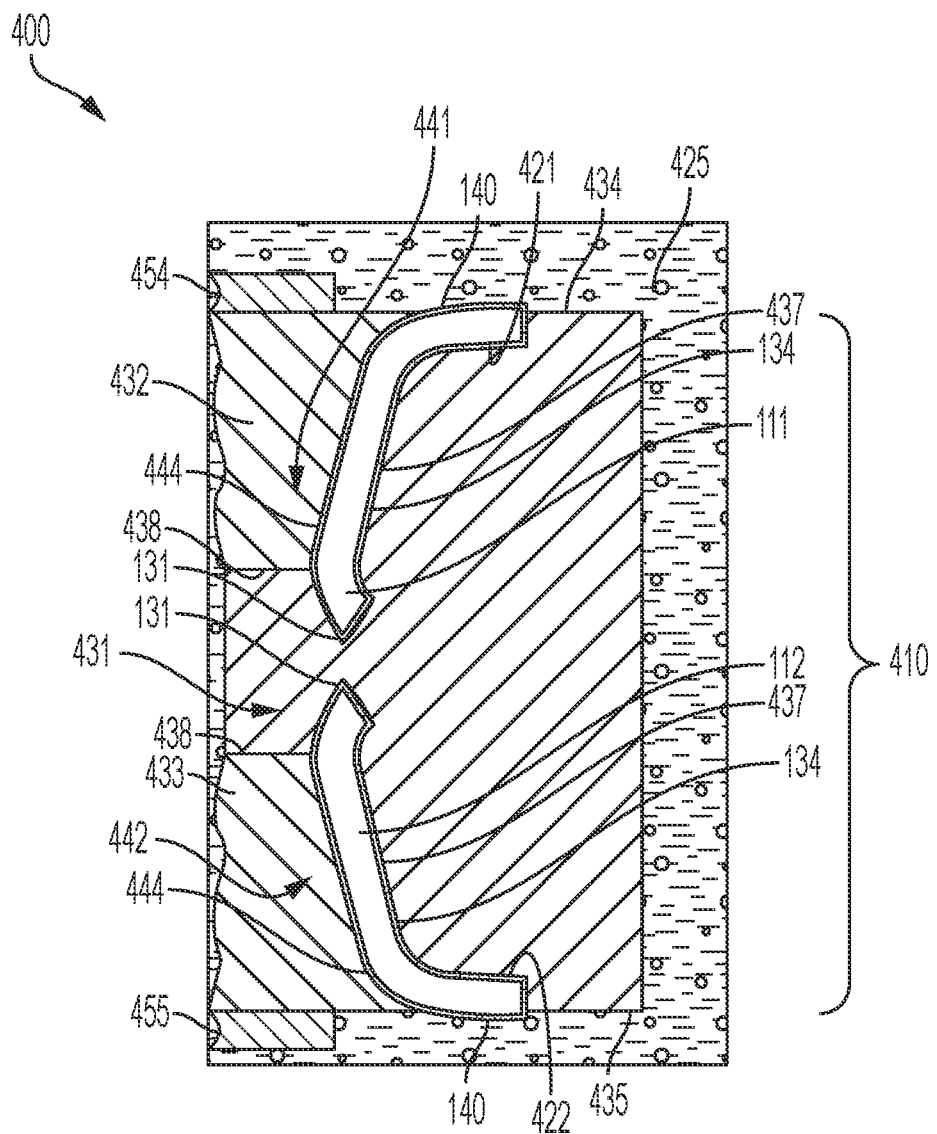
FIG. 11 is a sectional view of the appliance of FIG. 10.

Referring to FIGS. 10 and 11, another embodiment of an appliance (or mask) 400 is shown which is for use in a method of making an annular seal ring of a seal assembly, and is constructed according to principles of the present disclosure. The appliance 400 includes a masking member 410 and a connector assembly 415. The masking member 410 can be placed over at least an area of the layer of coating composition applied to the exterior surface of a seal ring. In embodiments, the masking member 410 can be configured such that the masking member 410 is positionable with respect to a sealing band of a seal ring such that the masking member 410 is offset from the sealing band to leave the sealing band exposed.

The masking member 410 of FIGS. 10 and 11 defines therein first and second circumferential grooves 421, 422 configured to receive respectively therein the first and second seal rings 111, 112 such that the sealing band 140 of both of the seal rings 111, 112 disposed within the masking member 410 are exposed and can be isotropically finished at the same time (see FIG. 11) in a process using a polishing media 425. Referring to FIG. 11, in the illustrated embodiment, the first and second circumferential grooves 421, 422 have substantially the same configuration such that the first and second seal rings 111, 112 can be interchangeably disposed therein. In the illustrated embodiment, the first and second circumferential grooves 421, 422 of the masking member 410 are configured such that the first and second seal ring 111, 112 are respectively disposable within the circumferential grooves 421, 422 with the load end 131 being within the respective circumferential groove 421, 422, the loading surface 134 being covered by the masking member 410, and the sealing band 140 and a portion of the inner relieved area 245 being exposed.

The masking member 410 includes a first masking part 431, a second masking part 432, and a third masking part 433. The first masking part 431 includes a first face 434 and a second face 435 each with an inner sidewall 437 and a base 438 defining a first circular recess 441 and a second circular recess 442, respectively. The second masking part 432 and the third masking part 433 have substantially the same construction. The second masking part 432 and the third masking part 434 each have an outer perimeter 444 that respectively cooperates with the first masking part 431 to define the first and second circumferential grooves 421, 422. In embodiments where the masking member 410 includes a single circumferential groove, the second circular recess 442 of the first masking part 431 and/or the third masking part 433 can be omitted.

The second masking part 432 is configured such that the second masking part 432 is positionable within the first circular recess 441 of the first masking part 431. The inner sidewall 437 of the first face 434 of the first masking part 431 and the outer perimeter 444 of the second masking part 432 cooperate together to define the first circumferential groove 421.

The third masking part 433 is configured such that the third masking part 433 is positionable within the second circular recess 442 of the first masking part 431. The inner sidewall 437 of the second face 435 of the first masking part 431 and the outer perimeter 444 of the third masking part 433 cooperate together to define the second circumferential groove 422.

The connector assembly 415 is provided for removably connecting the first masking part 431, the second masking part 432, and the third masking part 433 together such that the first masking part 431 is interposed between the second masking part 432 and the third masking part 433. The connector assembly 415 of FIGS. 10 and 11 includes a threaded fastener 451, a nut 452, and a pair of backing plates 454, 455. Each of the first part 431, the second part 432, the third part 433, and the pair of backing plates 454, 455 can define therein a respective central opening 457, 458, 459 configured to accommodate the threaded fastener 451 therethrough. The nut 452 can be threadingly mounted to the threaded fastener 451 to secure the backing plates 454, 455 and the first, second, and third masking parts 431, 432, 433 together.

The connector assembly 415 can be arranged such that the first masking part 431 is interposed between the second and third masking parts 432, 433 and the pair of backing plates 454, 455 sandwich the first, second, and third masking parts 431, 432, 433 therebetween. The backing plates 454, 455 can be configured to help provide rigidity to the first, second, and third masking parts 431, 432, 433, which are made from a flexible, soft material, so the first, second, and third masking parts 431, 432, 433 do not bend excessively during the isotropic finishing process to allow the seal rings 111, 112 disposed therein to fall out. The backing plates 454, 455 can be made from a suitable metal, such as steel, for example.

The masking member 410 can comprise multiple masking parts to facilitate the insertion of the respective seal rings 111, 112 therein. In one arrangement, the first seal ring 111 can be placed within the first circular recess of the first masking part, and the second masking part can be placed within the first seal ring to trap the first seal ring 111 between the first masking part and the second masking part. The second seal ring 112 can be placed within the second circular recess of the first masking part, and the third masking part can be placed within the second seal ring to trap the second seal ring 111 between the first masking part and the third masking part. The connector assembly 415 can be used to secure the backing plates 454, 455 and the first, second, and third masking parts 431, 432, 433 together such that the first and second seal rings 111, 112 are disposed and retained within the first and second circumferential grooves 421, 421.

In situations where the masking member 410 is used in connection with polishing a single seal ring, the seal ring can be positioned within one of the first and second circular recesses, and one of the second and third masking parts can be associated with the selected one of the first and second circular recesses of the first masking part. The other of the second and third masking parts can be omitted. The connector assembly 415 can be used to secure the components engaging the seal ring together.

In the illustrated embodiment, the inner sidewall 437 of the first and second circular recesses 434, 435 of the first masking part 431 can be configured to have a shape that is complementary to the outer portion of the seal ring that is intended to be disposed within the respective circular recess 434, 435. In embodiments, the outer perimeter 444 of the second masking part 432 and the third masking part 433 can be can be configured to have a shape that is complementary to the inner portion of the seal ring that is intended to be disposed radially between the associated inner sidewall 437 of the first masking part 431 and the respective outer perimeter 444 of the second masking part 432 and the third masking part 433.

In other embodiments, the inner sidewall 437 of the first and second circular recesses 434, 435 of the first masking part 431 and the outer perimeter 444 of both the second masking part 432 and the third masking part 433 can be generally cylindrical. The connector assembly 415 can be used to compressively engage the second and third masking parts 432, 433 such that the inner sidewall 437 of the first and second circular recesses 434, 435 of the first masking part 431 and the outer perimeter 444 of both the second masking part 432 and the third masking part 433 substantially conform to the complementary shape of the first and second seal rings 111, 112 against which the respective parts are engaged.

In embodiments, the masking member 410 can be made from any suitable material. In embodiments, the masking member 410 is made from an acid-resistant material that is non-reactive with a predetermined polishing media for an isotropic finishing process.

In embodiments, the masking member 410 is made from a material having a suitable hardness, such as, one having a durometer hardness of 100 Shore A or less. In embodiments, the masking member 410 is made from a material having a durometer hardness in a range between 20 and 100 Shore A, and in a range between 45 and 100 Shore A in other embodiments. In embodiments, the masking member 310 is made from a suitable rubber material. In embodiments, the masking member 310 is made from a suitable silicone material, such as, a suitable silicone rubber that undergoes high-temperature vulcanization or one that undergoes room-temperature vulcanization. In embodiments, the masking member 310 is made from a silicone material that is a pourable, addition-curing, two-component silicone rubber that vulcanizes at room temperature, for example, one commercially-available from Wacker Chemie AG of Germany under the tradename Elastosil®, such as, Elastosil® M 4601. In yet other embodiments, the masking member 410 is made from a material having a hardness greater than 100 Shore A, such as a hard plastic or metal, for example.

The appliance 400 of FIGS. 10 and 11 can be similar in other respects to the appliance of FIGS. 8 and 9. Variations of the appliance 400 shown in FIGS. 10 and 11 are also possible in a manner similar to those discussed in connection with the appliance 300 of FIGS. 8 and 9. It will be understood from the foregoing discussion that yet other embodiments are possible of an appliance which is for use in a method of making an annular seal ring of a seal assembly, and is constructed according to principles of the present disclosure.

In embodiments, a method of making a seal ring for a seal assembly following principles of the present disclosure can be used to make an embodiment of a seal ring according to principles discussed herein. In embodiments of a method of making a seal ring for a seal assembly following principles of the present disclosure, an appliance constructed according to principles of the present disclosure is used to make a seal ring with an isotropically finished seal band as discussed herein. In embodiments, a method of making a seal ring for a seal assembly following principles of the present disclosure can be used with an embodiment of an appliance according to principles discussed herein.

Figure 12:
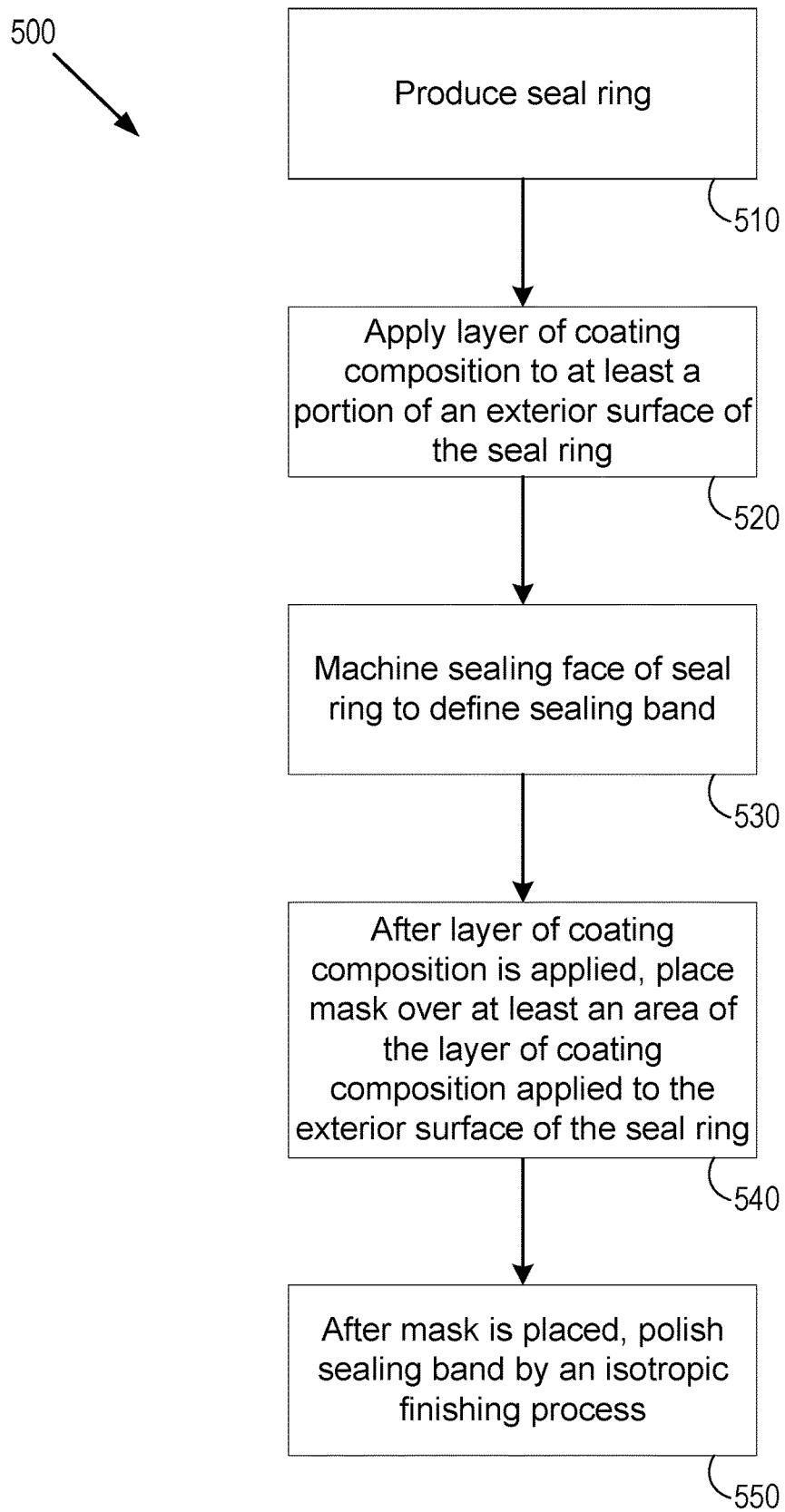
FIG. 12 is a flow chart illustrating steps of an embodiment of a method of making a seal ring for a seal assembly following principles of the present disclosure.

Referring to FIG. 12, steps of an embodiment of a method 500 of making a seal ring for a seal assembly in accordance with principles of the present disclosure are shown. The seal ring is produced (step 510). In embodiments, the seal ring can be produced in step 510 using any suitable technique, such as by being stamped and formed or by being cast, for example. For example, in embodiments, the seal ring is produced by stamping a seal ring blank or button to form the seal ring. In embodiments, the seal ring can be produced using any suitable casting technique, such as by a static cast process, for example. In embodiments, the seal ring can be heat treated as part of its being produced.

The seal ring can include a load end, a seal end, a loading surface, and a sealing face. The load end and the seal end are in spaced relationship to each other along a longitudinal axis. The loading surface extends along the longitudinal axis between the load end and the seal end. The sealing face is disposed at the seal end and is annular. The sealing face extends radially with respect to the longitudinal axis.

In embodiments, the seal ring can be machined to at least one predetermined tolerance. The seal ring can be machined such that the thickness of the seal flange is within a predetermined tolerance, the seal ramp angle is within a predetermined tolerance, and other dimensional tolerances are met, for example. The seal ring can be machined by any suitable technique, such as by using a lathe for lathe-turning and/or grinder for grinding operations, for example.

A layer of coating composition is applied to at least a portion of an exterior surface of the seal ring (step 520). Any suitable technique can be used to apply the layer of coating composition. For example, in embodiments, the layer of coating composition is applied using at least one of an autodeposition process, an electro-deposition process, and a plating process (e.g., an electroplating process or an electroless plating process). In embodiments, any suitable autodeposition process, electro-deposition process, or plating process known to one skilled in the art can be used to apply the layer of coating composition.

In embodiments, before the layer of coating composition is applied to the seal ring, the seal ring can be cleaned to remove any foreign substances deposited on the exterior surface of the metallic substrate of the seal ring to which the layer of coating composition is to be applied. Such foreign substances, may include, for example, grease, dirt, dust, oils, or any other substances that may interfere with a coating process. The seal ring can be cleaned, and/or degreased, using any known physical or chemical means. For example, a cleaning agent, such as any commercially-available alkaline or acidic cleaning agents, may be used. In addition, the seal ring can be subjected to grit blasting using a suitable abrasive media to enhance the adhesion of the layer of coating composition to the exterior surface of the seal ring.

In embodiments, the coating composition can be made from any suitable material. For example, in embodiments, the coating composition is formulated to withstand the isotropic finishing process used to polish the sealing bands such that it resists being removed from the seal ring during the isotropic finishing process. In embodiments, the coating composition can be made from a material that has an enhanced property or characteristic relative to the material from which the seal ring is made. For example, in embodiments, the seal ring is made from a seal ring material (e.g., a ferrous alloy), and the layer of coating composition is more corrosion resistant than the seal ring material. In embodiments, the coating composition includes a material possessing a rust preventative characteristic. In embodiments, the coating composition comprises a suitable phosphate coating. For example, in embodiments, the coating composition comprises a manganese phosphate coating material.

In embodiments, the layer of coating composition is applied using an autodeposition process, and the layer of coating composition comprises an epoxy. In embodiments, the layer of coating composition comprises an epoxy-acrylic resin. In embodiments, the layer of coating composition comprises a suitable autodepositable coating composition, including, for example, a coating composition marketed under the brand name Autophoretic® or Autophoretic Coating Chemicals® by Henkel Surface Technologies. In embodiments, the autodepositable coating composition comprises an Autophoretic® coating composition including an epoxy-acrylic based resin. In embodiments, the autodepositable coating composition comprises a coating composition marketed by Henkel Surface Technologies as Bonderite Metal Pre-treatment Paint Process (BONDERITE M-PP) 930. In yet other embodiments, the layer 142 of coating composition can comprise other suitable autodepositable coating compositions.

In embodiments, the layer of coating composition is applied using any suitable autodeposition process in which a waterborne coating composition is applied to the seal ring by means of a chemical reaction. Specifically, the seal ring can be dipped, or immersed, into a chemical bath, where pigment and resin particles may be deposited onto the exterior surface thereof (or at least a portion thereof).

As is known in the art, the seal ring can undergo one or more rinse stages, after application of the autodepositable coating composition. For example, the seal ring can undergo a first rinse to remove any coating composition material that has not adhered to the exterior surface of the seal ring. In addition, a reaction rinse may be provided to allow new properties, such as, for example, increased corrosion resistance, to be introduced to the autodepositable coating composition before curing. After the rinse stages, the seal ring can be heated, using any suitable technique known to one skilled in the art, to a temperature sufficient to cure the autodepositable coating composition. Specifically, the seal ring can be heated to a target temperature for a predetermined time to sufficiently cure the autodepositable coating composition.

In addition, it should be understood that in embodiments, the layer of coating composition can be applied to more than the intended application area of the seal ring in the application process. In embodiments, one or more portions of the seal ring which have the layer of coating material application can be treated, such as by machining processes to remove the applied layer of coating composition therefrom. For example, the layer of coating composition can be applied to the exterior surface of the seal ring by dipping the entire seal ring into the chemical bath. In embodiments, the layer of coating composition can be applied to the sealing face and/or the internal cylindrical surface of the seal ring. In embodiments, the layer of coating composition applied to the sealing face and/or the internal cylindrical surface of the seal ring can be removed using machining techniques known to those skilled in the art. In other embodiments, masking techniques can be used to protect one or more portions of the exterior surface of seal ring such that the coating composition is inhibited from adhering thereto.

The sealing face of the seal ring is machined to define a sealing band (step 530). In step 530, the sealing face can be machined using any suitable technique, such as by lapping with a flat lap, for example, to define the sealing band.

In embodiments, the sealing face of the seal ring can be machined to define an inner relieved area. The sealing band is disposed radially outward of the inner relieved area along the sealing face. In embodiments, the sealing face can be machined using any suitable technique, such as by lapping with a spherical lap, for example, to define the inner relieved area.

After the layer of coating composition is applied, a mask is placed over at least an area of the layer of coating composition applied to the exterior surface of the seal ring (step 540). The mask is positioned with respect to the sealing band such that the mask is offset from the sealing band to leave the sealing band exposed.

In embodiments, the mask is applied by disposing the seal ring within a masking member. The masking member defines a circumferential groove. The load end of the seal ring is disposed within the circumferential groove. In embodiments, the circumferential groove defined by the masking member is configured such that the seal ring is disposed within the circumferential groove with the loading surface being covered and only a part of the sealing face containing the sealing band being exposed.

In embodiments, the masking member includes a first masking part and a second masking part. The first masking part includes an inner sidewall and a base defining a circular recess. The second masking part has an outer perimeter. The second masking part is configured such that the second masking part is positionable within the circular recess of the first masking part. The inner sidewall of the first masking part and the outer perimeter of the second masking part cooperate together to define the circumferential groove.

In embodiments, the masking member can be made from any suitable material. In embodiments, the masking member is made from an acid-resistant material that is non-reactive with a polishing media used in the isotropic finishing process. In embodiments, the masking member is made from a material having a durometer hardness of 60 Shore A or less. In embodiments, the masking member is made from a material having a durometer hardness in a range between 25 and 55 Shore A.

In embodiments, the masking member can be made using any suitable technique, as will be appreciated by one skilled in the art. In embodiments, the masking member is made by inverse molding a prototype seal ring.

After the mask is placed, the sealing band is polished by subjecting the sealing band to an isotropic finishing process (step 550). In embodiments, the sealing band is polished by subjecting the sealing band to isotropic finishing such that the sealing band has a surface roughness average of about 0.3 micrometers Ra or less; of about 0.2 micrometers Ra or less in other embodiments; about 0.15 micrometers Ra or less in still other embodiments; and about 0.1 micrometers Ra or less in yet other embodiments.

In embodiments, once the sealing band is polished in step 550, the inner relieved area and the sealing band of the sealing face substantially do not have the layer of coating composition applied thereto. In other words, once the sealing band is polished, the sealing band of the sealing face substantially does not have the layer of coating composition applied thereto. To the extent that the layer of coating composition is applied to the sealing face, it can be removed therefrom during the machining step(s) and/or through other machining operations so that the sealing band can be isotropically finished.

In embodiments, any suitable isotropic finishing process can be used to polish the sealing band. In embodiments, the processing procedure for isotropic finishing can involve two cycles, namely a cut cycle and a burnish cycle. The cycle time can vary depending upon the initial surface finish and part geometry tolerance. In embodiments, the cycle times can be determined such that seal ring part geometry, e.g., corners, roundness, slopes, openings, etc., remain within tolerance.

In embodiments, subjecting the sealing band to isotropic finishing comprises applying a cutting fluid to the surface of the component to yield an isotropic surface finish. In embodiments, the cutting fluid has a pH of about five to about six. For example, in embodiments, the acid used in the cut cycle is one of phosphoric acid and oxalic acid with a pH value between about five and about six.

For example, in embodiments, the seal ring is subjected to acid resurfacing wherein the seal ring is submerged in a cutting fluid mixture of an appropriate acid such as phosphoric or oxalic acid, with a pH value between about five and about six as described above. The acid resurfacing may be executed in a processing tank. The cutting fluid can be introduced into the processing tank from a cutting fluid reservoir via an electronically-controlled cutting fluid valve operated by a refinishing processor. The refinishing processor can comprise a digital microcomputer or microprocessor associated with a non-transitory, computer-readable digital memory containing computer-executable code for controlling the operation of the refinishing processor. An agitator or other flow enhancement means can also be used to speed the processing of the seal ring in the processing tank.

The cutting process can proceed by removing the asperities, i.e., high points, in the surface of the sealing band of the seal ring, while elements in the solution protect the low points. In this way, asperities become broadened and lowered to an extent that the irregularities eventually become sufficiently minor and isotropic.

In embodiments, subjecting the sealing band to isotropic finishing further comprises applying a burnishing solution to the surface of the component. In embodiments, the burnishing solution has a pH of about seven to about nine. For example, in embodiments, the solution used in the burnish cycle is a slip agent at a pH of about seven to about nine. In embodiments, the cut or burnish fluid need not be removed prior to adding fluid for the burnish cycle or prior to adding fluid to maintain the pH of the fluid. After burnishing, the processed seal rings can be completely rinsed to prevent further etching or erosion.

For example, in embodiments, once the surface cutting stage is complete, the sealing band is burnished in an embodiment. A burnishing solution, e.g., a slip agent having a pH of about seven to about nine, is flowed over the sealing band of the seal ring. In embodiments, the cutting fluid is drained prior to introduction of the burnishing solution. In other embodiments, the burnishing solution itself is used to displace the cutting fluid. An electronically-controlled cutting fluid valve from the cutting fluid reservoir can be closed, while an electronically-controlled evacuation valve is opened to drain the processing tank. Contemporaneously, an electronically-controlled burnishing solution valve arranged with a burnishing solution tank can be opened to admit the burnishing solution into the processing tank.

The burnishing solution can act to further smooth the sealing band of the seal ring and also to neutralize the cutting fluid to avoid continued cutting. After the burnishing cycle, the seal ring can be rinsed to cease the isotropic finishing cycles.

INDUSTRIAL APPLICABILITY

The industrial applicability of the embodiments of an alloy for a seal ring, a seal ring for a seal assembly, a method of making a seal ring described, and an appliance for use in a method of making an annular seal ring of a seal assembly herein will be readily appreciated from the foregoing discussion. The described principles are applicable to machines and equipment including a wheel assembly such that one member is rotatably movable with respect to the other member. A wheel assembly can include at least one seal assembly constructed in accordance with the present principles. In other embodiments, a seal ring constructed according to principles of the present disclosure can be used in a seal assembly used in a different application, such as a slurry pump auger or a pin joint assembly for a linkage assembly, for example.

During use, the first and second seal rings 111, 112 can help prevent a fluid, such as, a lubricant (not shown), e.g., from leaking out of an internal cavity. The first and second seal rings 111, 112 provide a running seal therebetween. Specifically, the first and second seal rings 111, 112 rotate relatively against one another in sealing engagement. The first and second load rings 121, 122 act in the manner of a spring to apply an axial load respectively against the first and second seal rings 111, 112 in opposing directions along the longitudinal axis "LA" to bring the sealing bands 140 of the first and second seal rings 111, 112 into face-to-face sealing contact under pressure such that a running fluid-tight seal is formed. The structure of the seal cavity 40 can help maintain the first and second load rings 121, 122 in proximal relationship to the first and second seal rings 111, 112, respectively, to promote the opposing axial forces exerted by the first and second seal rings 111, 112 against each other. Accordingly, fluid can be restrained from escaping from the seal cavity 40 under difficult loading conditions.

Construction of the sealing bands 140 is such that an effective fluid tight seal can be produced readily upon installation of the first and second seal rings 111, 112 in a joint. The sealing bands 140 can have a consistent surface finish produced using an isotropic finishing process. Isotropic finishing can modify the surface finish and/or texture of the sealing band to improve its performance through reduced galling or wear when relative sliding occurs. Subjecting the sealing band to isotropic finishing can help decrease pitting fatigue and extending the useful life of the seal ring.

Furthermore, before the isotropic finishing process takes place, a layer of coating composition can be applied to the exterior surface of the seal ring to enhance its corrosion and/or rust resistance, for example. The layer of coating composition applied to areas of the sealing ring other than the sealing band can be protected during the isotropic finishing process by a mask constructed according to principles of the present disclosure.

In embodiments, the mask can be made form a soft material to help increase the longevity of use of the mask for multiple uses as a mask during the polishing of different seal rings in multiple isotropic finishing process cycles. The soft material has very small wear in rubbing against the ceramic polishing media used in the isotropic finishing process and, therefore, can be used over multiple cycles.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An appliance for use in a method of making an annular seal ring of a seal assembly, the annular seal ring having a load end, a seal end, a loading surface, and a sealing face, the loading surface extending axially between the load end and the seal end, the sealing face extending radially at the seal end, and the sealing face having a sealing band, the appliance comprising:
   a masking member, the masking member defining a circumferential groove;
   wherein the circumferential groove being configured such that the annular seal ring is disposable within the circumferential groove with the load end being within the circumferential groove, the loading surface being covered by the masking member, and the sealing band being exposed.

2. The appliance according to claim 1, wherein the masking member is made from an acid-resistant material that is non-reactive with a predetermined polishing media for an isotropic finishing process.

3. The appliance according to claim 1, wherein the masking member includes a first masking part and a second masking part, the first masking part including an inner sidewall and a base defining a circular recess, the second masking part having an outer perimeter, the second masking part being configured such that the second masking part is positionable within the circular recess of the first masking part, the inner sidewall of the first masking part and the outer perimeter of the second masking part cooperating together to define the circumferential groove.

4. The appliance according to claim 1, wherein the annular seal ring comprises a first annular seal ring and the circumferential groove comprises a first circumferential groove, wherein the masking member defines a second circumferential groove, the second circumferential groove being configured such that a second annular seal ring is disposable within the second circumferential groove with the load end of the second annular seal ring being within the second circumferential groove, the loading surface of the second annular seal ring being covered by the masking member, and the sealing band of the second annular seal ring being exposed.

5. The appliance according to claim 4, wherein the masking member includes a first portion and a second portion, each of the first portion and the second portion including a base and a face, the face of the first portion defining the first circumferential groove, and the face of the second portion defining the second circumferential groove, the appliance further comprising:
   a connector assembly, the connector assembly for removably connecting the first portion and the second portion together such that the base of the first portion and the base of the second portion are in abutting relationship to each other, and the face of the first portion and the face of the second portion are in outward opposing relationship to each other.

6. The appliance according to claim 4, wherein the masking member includes a first masking part, a second masking part, and a third masking part,
   the first masking part including a first face and a second face each with an inner sidewall and a base defining a first circular recess and a second circular recess, respectively,
   the second masking part and the third masking part each having an outer perimeter,
   the second masking part being configured such that the second masking part is positionable within the first circular recess of the first masking part, the inner sidewall of the first face of the first masking part and the outer perimeter of the second masking part cooperating together to define the first circumferential groove, and
   the third masking part being configured such that the third masking part is positionable within the second circular recess of the first masking part, the inner sidewall of the second face of the first masking part and the outer perimeter of the third masking part cooperating together to define the second circumferential groove, the appliance further comprising:
   a connector assembly, the connector assembly for removably connecting the first masking part, the second masking part, and the third masking part together such that the first masking part is interposed between the second masking part and the third masking part.

* * * * *